(12) United States Patent
Adams

(10) Patent No.: US 7,144,041 B2
(45) Date of Patent: Dec. 5, 2006

(54) ALUMINUM HANGER AND HANGER ASSEMBLY

(75) Inventor: James H. Adams, Tallmadge, OH (US)

(73) Assignee: East Manufacturing Corporation, Randolph, OH (US)

(*) Notice: Subject to any disclaimer, the term of this patent is extended or adjusted under 35 U.S.C. 154(b) by 0 days.

(21) Appl. No.: 10/699,111

(22) Filed: Nov. 1, 2003

(65) Prior Publication Data

US 2004/0090059 A1    May 13, 2004

Related U.S. Application Data

(63) Continuation-in-part of application No. 10/194,934, filed on Jul. 12, 2002, now Pat. No. 6,890,003.

(51) Int. Cl.
*B62D 63/08*    (2006.01)

(52) U.S. Cl. ..................................... 280/789

(58) Field of Classification Search ............... 280/789, 280/124.125, 124.116
See application file for complete search history.

(56) References Cited

U.S. PATENT DOCUMENTS

| | | | |
|---|---|---|---|
| 3,738,679 A * | 6/1973 | Jackson ..................... 280/86.5 |
| 3,782,753 A * | 1/1974 | Sweet et al. .......... 280/124.101 |
| 4,093,272 A * | 6/1978 | Raidel ........................ 280/686 |
| 4,162,090 A | 7/1979 | Schwartz |
| 4,718,692 A | 1/1988 | Raidel |
| 5,171,036 A | 12/1992 | Ross |
| 5,337,997 A | 8/1994 | Hockney |
| 5,354,165 A | 10/1994 | Booher |
| 5,366,237 A | 11/1994 | Dilling et al. |
| 5,375,871 A | 12/1994 | Mitchell et al. |
| 5,482,356 A | 1/1996 | Goodson, Jr. |
| 5,509,724 A | 4/1996 | Perry et al. |
| 5,655,788 A | 8/1997 | Peaker |
| 5,758,927 A | 6/1998 | Koester |
| 5,782,538 A | 7/1998 | Backs |
| 6,213,507 B1 | 4/2001 | Ramsey et al. |
| 6,425,593 B1 | 7/2002 | Fabris et al. |
| 6,428,026 B1 | 8/2002 | Smith |
| 6,471,223 B1 | 10/2002 | Richardson |
| 6,491,314 B1 | 12/2002 | Smith et al. |
| 6,508,393 B1 | 1/2003 | Chalin |
| 6,604,734 B1 | 8/2003 | Griffiths |
| 2001/0030406 A1 | 10/2001 | Pierce |

FOREIGN PATENT DOCUMENTS

EP    0 773 119 A1    5/1997

* cited by examiner

*Primary Examiner*—Michael J. Carone
*Assistant Examiner*—Bret Hayes
(74) *Attorney, Agent, or Firm*—Fay, Sharpe, Fagan, Minnich & McKee, LLP

(57) ABSTRACT

A hanger assembly comprises a pair of hangers; a pair of trailer attachment plates, each attachment plate attached to one of the pair of hangers; and a transverse support member having a first end attached to one of the pair of hangers and a second end attached to the remaining hanger of the pair of hangers. The hanger assembly is made of aluminum and provides a lightweight, high strength hanger assembly for a trailer that cuts down on the weight of the trailer without diminishing the strength as compared to conventional trailers, and that is compatible with a conventional air ride suspension system and retrofittable on existing aluminum trailers in a bolt-on configuration.

10 Claims, 6 Drawing Sheets

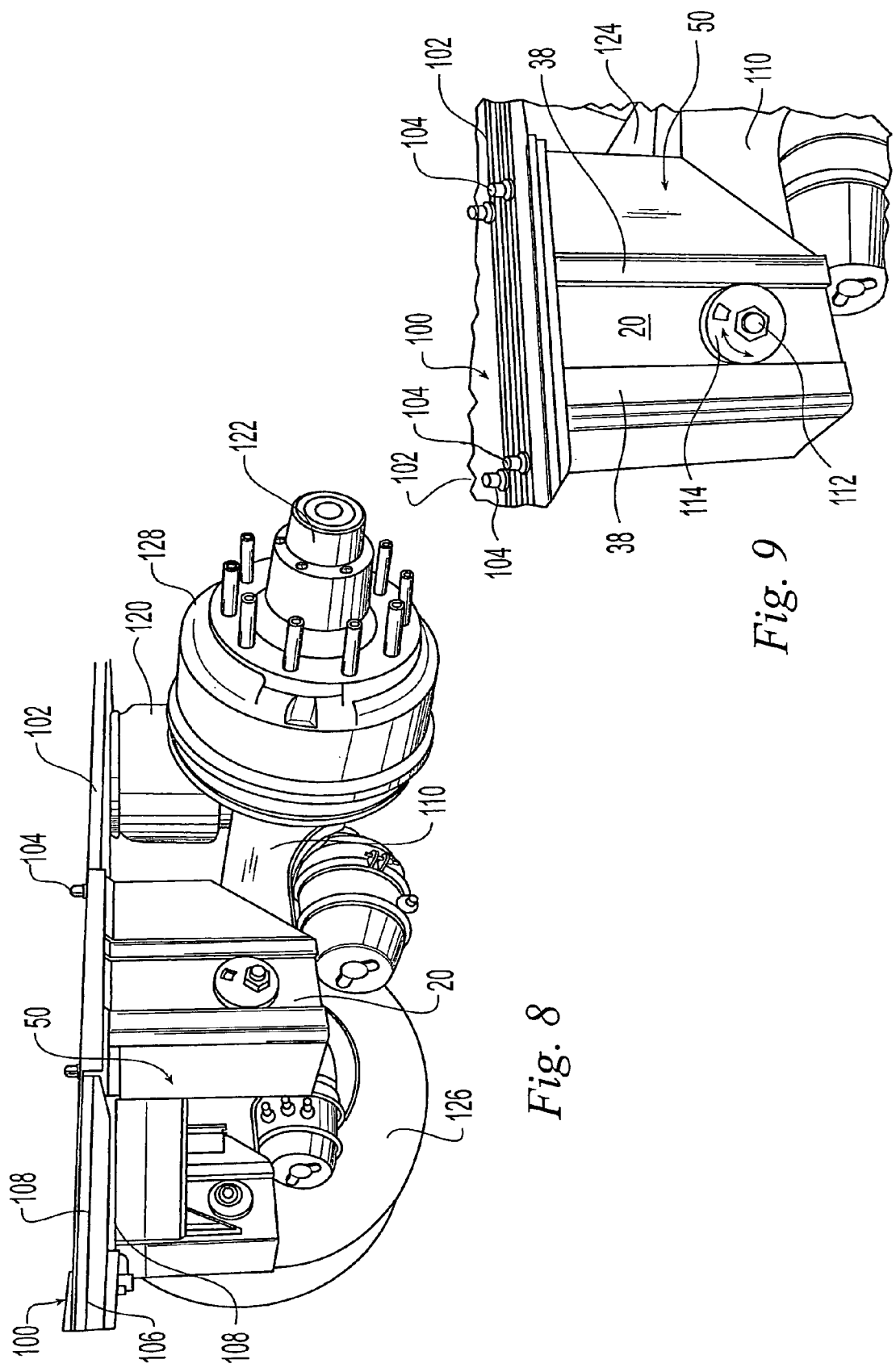

ALUMINUM HANGER AND HANGER ASSEMBLY

TECHNICAL FIELD

This application is a continuation-in-part of U.S. patent application Ser. No. 10/194,934, filed Jul. 12, 2002, now U.S. Pat. No. 6,890,003 B2, which is herein incorporated by reference. The present invention relates generally to an aluminum hanger assembly for trailers. More particularly, this invention relates to a lightweight, high-strength, aluminum hanger used in a hanger assembly and attachable to a standard aluminum trailer, which allows for connection of a conventional suspension arm, air spring, and shock absorber.

BACKGROUND OF THE ART

A wide variety of trailers have been developed for transportation of various goods via roadways. Such trailers include platform trailers, refuse trailers, frame and frameless dump trailers as well as other types. In the various trailer configurations, suspension systems are provided in association with wheels of the trailer to provide a smoother ride and facilitate handling and transportation of loads thereby. As it is desired to maximize the load-carrying capacity of the trailer, the characteristics of the suspension system and mounting arrangement become an important aspect of the trailer design.

Prior trailers typically use a steel suspension system which includes steel hangers, steel brackets, suspension arm, air spring, and shock absorbers. The suspension arm is attached to the axle and the air spring; steel hangers, and steel brackets are generally attached to one or more central I-beams or a sub-frame foundation over the rear wheels of the trailer. This poses a particular problem for aluminum trailer frames, as the steel hangers cannot be welded directly to the aluminum frame. To overcome the problem, trailer manufacturers have added a steel attachment plate to the top of the steel hanger and a mating aluminum base plate on the bottom frame of the trailer. The steel attachment plate is then bolted to the aluminum base plate. However, substantial problems still exist. The steel suspensions and additional steel and aluminum attachment plates add a significant amount of weight to the trailer. The steel suspensions are subject to rust, and the dissimilar metal of the steel adjacent the aluminum can result in galvanic corrosion.

In the past, trailers had been manufactured using plates of aluminum sheet welded together and reinforced with reinforcing ribs. Now, some trailers are being manufactured using high strength extruded aluminum plate such as 6061. The extruded aluminum provides great advantages in terms of strength while eliminating much of the need for reinforcing ribs along the trailer body. However, the strength and durability required for many of the subframe and suspension components have substantially prevented the use of aluminum on either a subframe or suspension assembly. Prior art attempts to incorporate aluminum suspension components have either been too complex or too weak to be of any commercial benefit or success. In addition, there has been no option available to retrofit existing aluminum trailers with an aluminum hanger system. Accordingly, these material advantages have not been utilized in the structural components such as the suspension.

It would, therefore, be desirable to provide an aluminum hanger and hanger assembly which has the desired strength characteristics, while being of reduced weight, and which allows for various suspension systems to be integrated into the trailer construction in a simplified manner. It would also be desirable to provide an aluminum hanger assembly for mounting on existing aluminum trailers designed for or having steel hangers.

SUMMARY OF THE PRESENT INVENTION

It is, therefore, an object of the present invention to provide a lightweight, high strength, aluminum hanger and hanger assembly that significantly reduces the weight of the trailer without diminishing the strength as compared to conventional trailers and is compatible with conventional air ride suspension systems. At least one of these advantages are provided by a trailer hanger assembly comprising a pair of hangers, each hanger comprising a swing arm attachment portion comprising an outboard wall, an inboard wall generally perpendicular to the outboard wall, a pair of trailer attachment plates, each attachment plate attached to one of the pair of hangers; and a transverse support member having a first end attached to the outboard wall of one of the pair of hangers and a second end attached to the outboard wall of the remaining hanger of the pair of hangers; wherein the trailer hanger assembly is made of aluminum.

The invention is also directed to a method for making an aluminum hanger assembly for a trailer comprising the steps of: providing a pair of hangers, each hanger comprising a monolithic body formed from extruded aluminum, each body comprising a swing arm attachment portion and a shock absorber attachment bracket portion; attaching a trailer attachment plate to each hanger; providing a transverse support member having a first end and a second end; and attaching one of the pair of hangers to a first end of the transverse support member and attaching the remaining hanger to the second end of the transverse support member.

BRIEF DESCRIPTION OF THE DRAWINGS

A better understanding of the present invention will be had when reference is made to the accompanying drawings, wherein identical parts are identified with identical reference numerals, and wherein:

FIG. 8 is a perspective view of the hanger assembly of the present invention bolted and welded to the bottom of a trailer frame showing the attached air suspension components; and FIG. 9 is a perspective view of a hanger of the hanger assembly of the present invention bolted to the frame of a trailer.

DETAILED DESCRIPTION OF THE DRAWINGS

Aluminum hangers and aluminum hanger assemblies have been previously described in co-owned, pending application U.S. patent Ser. No. 10/194,934, herein incorporated by reference. However, the former application was primarily focused on an aluminum hanger and aluminum suspension manufactured into the aluminum trailer as part of the subframe or as part of the frameless trailer. However, the previously disclosed aluminum suspension was not readily usable as an aluminum hanger assembly for mounting on existing aluminum trailers designed for or having steel hangers.

Figure 1:
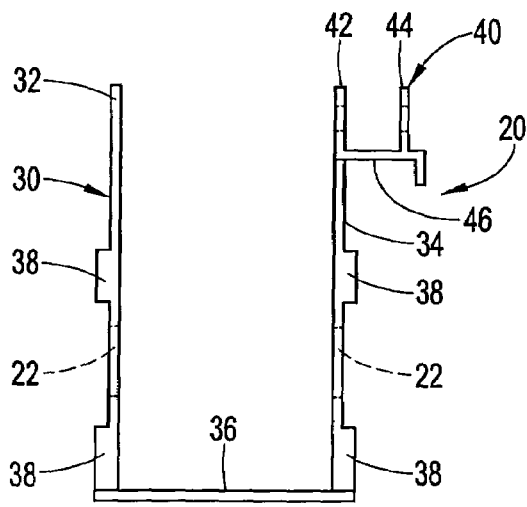
FIG. 1 is a top plan view of a hanger of the present invention.
Figure 2:
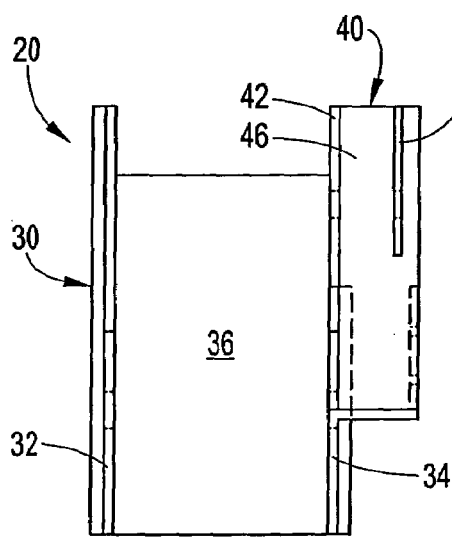
FIG. 2 is an interior side elevational view of the hanger of FIG. 1.
Figure 3:
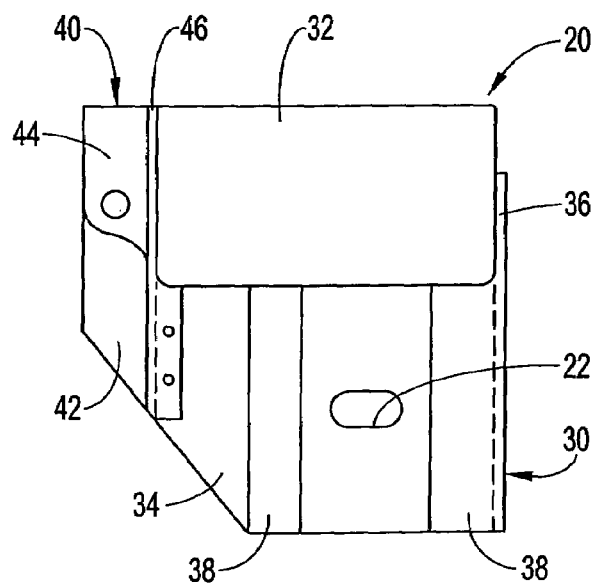
FIG. 3 is a front view of the hanger of FIG. 1.
Figure 4:
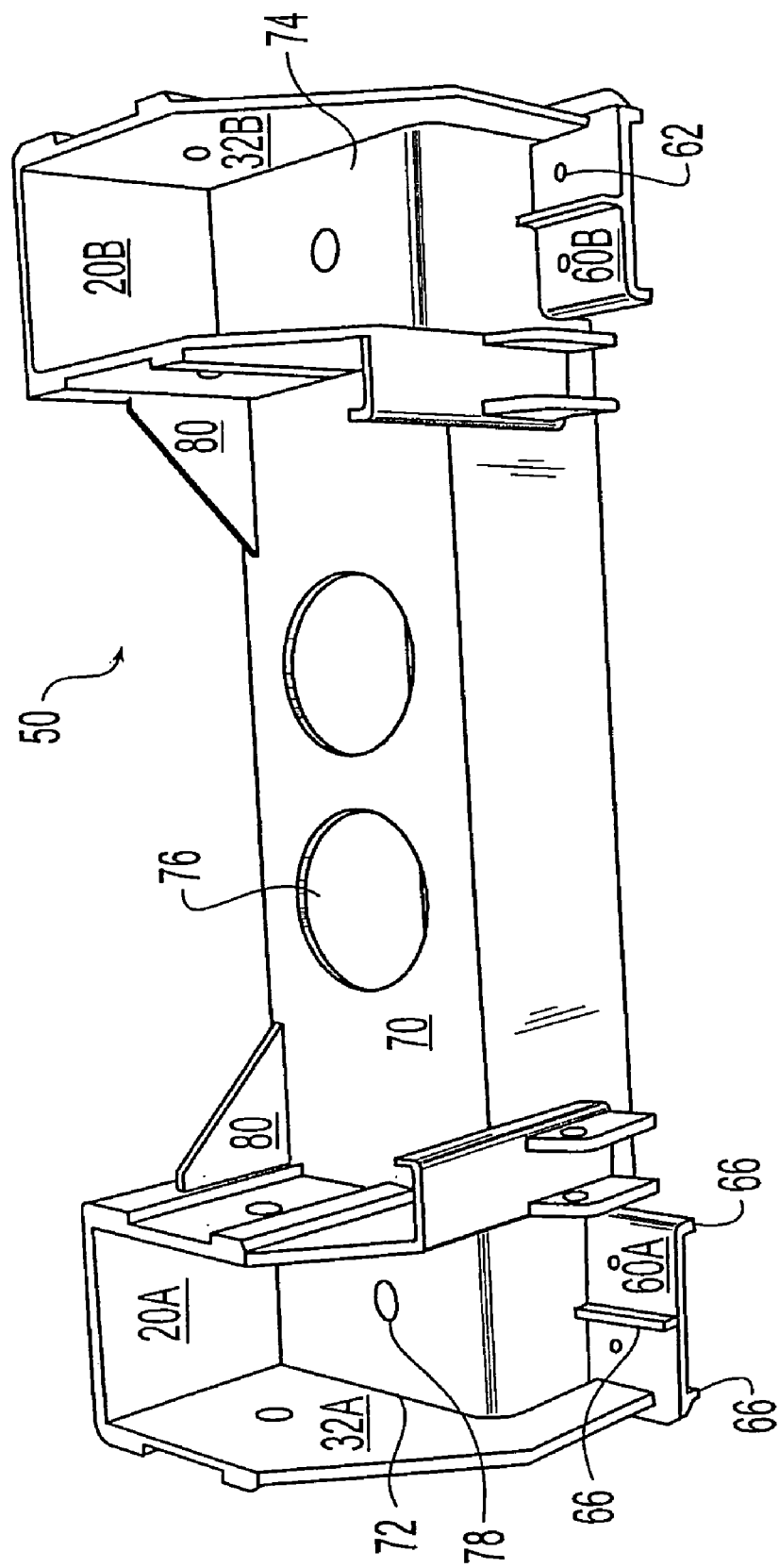
FIG. 4 is a bottom and bracket side perspective view of the hanger assembly of the present invention.

Referring now to FIGS. 1–3, a hanger 20 of the present invention is shown in various views. The hanger 20 comprises a swing arm attachment portion 30 and a shock absorber attachment bracket portion 40. The swing arm attachment portion 30 comprises a first wall 32, also referred to as the exterior or outboard wall, a second wall 34, also referred to as the interior or inboard wall, and a third wall 36, also referred to as the back wall, connecting and generally perpendicular to the exterior wall 32 and interior wall 34. The exterior wall 32 and interior wall 34 are formed with a pair of spaced-apart cross-sectional portions 38 that are substantially thicker than the remaining hanger walls. An aperture 22 is formed in the exterior wall 32 and interior wall 34 between portions 38 for attachment of the swing arm (not shown). The shock absorber attachment bracket portion 40 has a first wall 42 formed by a portion of the interior wall 34, a second wall 44 generally parallel to the first wall 42, and a third wall 46 connects the first and second walls 42, 44. An aperture 46 is formed in the first wall 42 and the second wall 44 for attachment of the shock absorber (not shown). The hanger 20 may be manufactured as an aluminum extruded tube and machined to its final dimensions. The extrusion of the tube may be net formed (formed close or at final thickness dimensions) to reduce final machining requirements.

Referring to FIGS. 4–7, a hanger assembly 50 of the present invention is shown. Hanger assembly 50 comprises a pair of hangers 20A, 20B, a pair of trailer attachment plates 60A, 60B, and a transverse support member 70. The transverse support member 70 may be a U-shaped channel or other rigid structure. The transverse support member 70 has a first end 72 attached to the exterior wall 32A of the first hanger 20A and a second end 74 attached to the exterior wall 32B of the second hanger 20B. The hanger 20A, 20B may be attached to the transverse support member 70 by welding adjacent interface surfaces including the shock absorber attachment portion 40 and the walls 32, 34, 36 of the swing arm attachment portion 30 as shown. The transverse support member 70, by extending generally the entire span of the hanger assembly 50, provides a significant improvement in the strength and durability of the hanger assembly 50. The transverse support member 70 may further comprise one or more apertures 76, 78 along the bottom of the member in low stress areas to allow for water drainage. The transverse support member 70 may be made of a single piece of aluminum plate that is bent to shape, extruded as a U-shape, or formed by welding aluminum plate.

The pair of trailer attachment plates 60A, 60B, are generally flat plates having a plurality of apertures 62 therethrough. The trailer attachment plates 60A, 60B, are attached to the top of the hangers 20A, 20B and are also attached to the transverse support member 70. These attachments may be made by welding adjacent interface surfaces as shown. The trailer attachment plates 60A, 60B, comprise a generally flat attachment surface 64 that mates flat against a frame member of a trailer (not shown). The trailer attachment plates 60A, 60B may further comprise a flange 66 extending from one or both ends of the attachment surface 64. The trailer attachment plates 60A, 60B may further comprise a flange 66 extending from the non attachment side of the attachment plates 60A, 60B. The flanges 66 provide additional strength to the hanger assembly 50 and may be formed as aluminum extrusions or aluminum plate.

Figure 5:
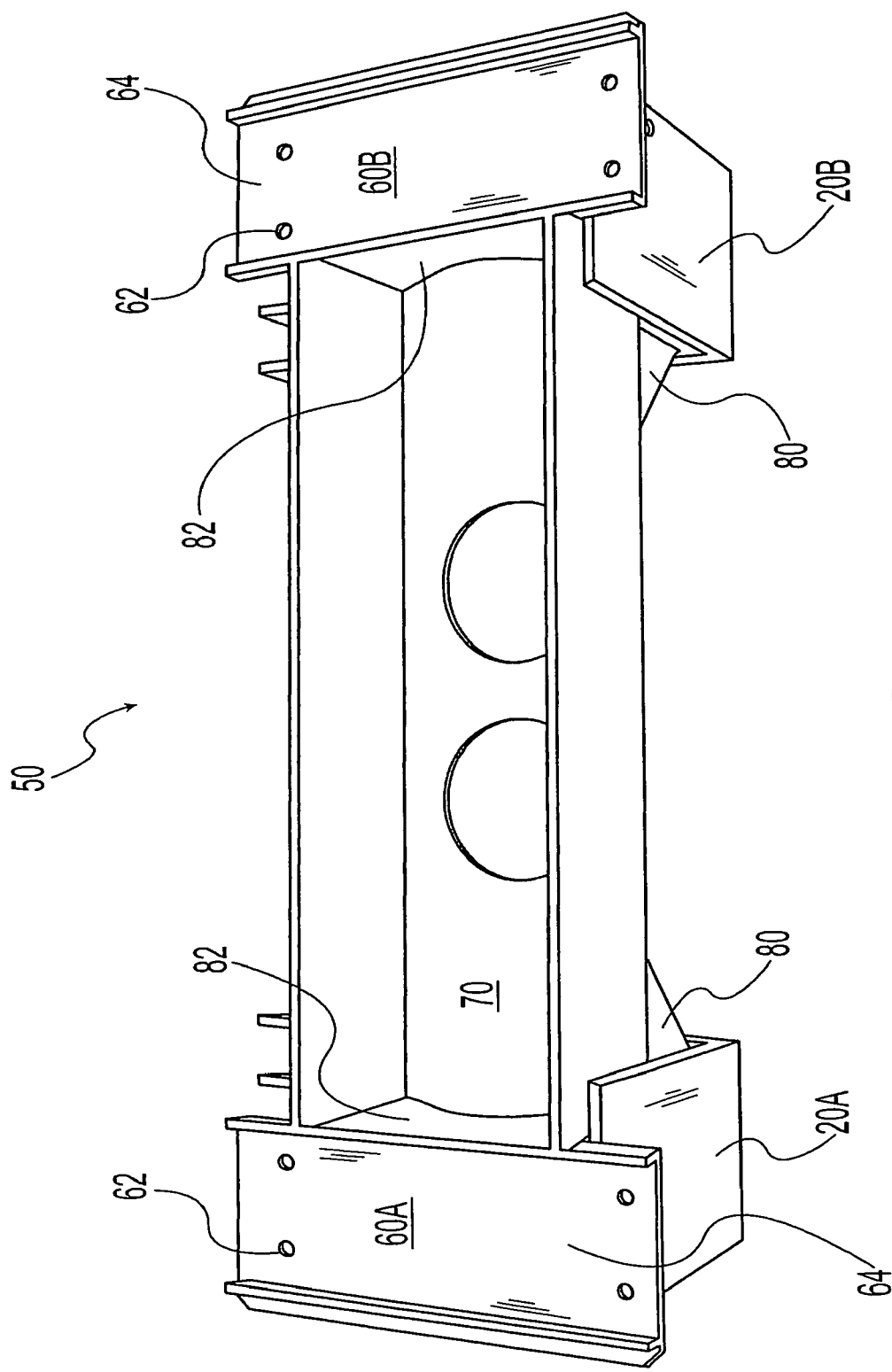
FIG. 5 is a top perspective view of the hanger assembly of FIG. 4.
Figure 6:
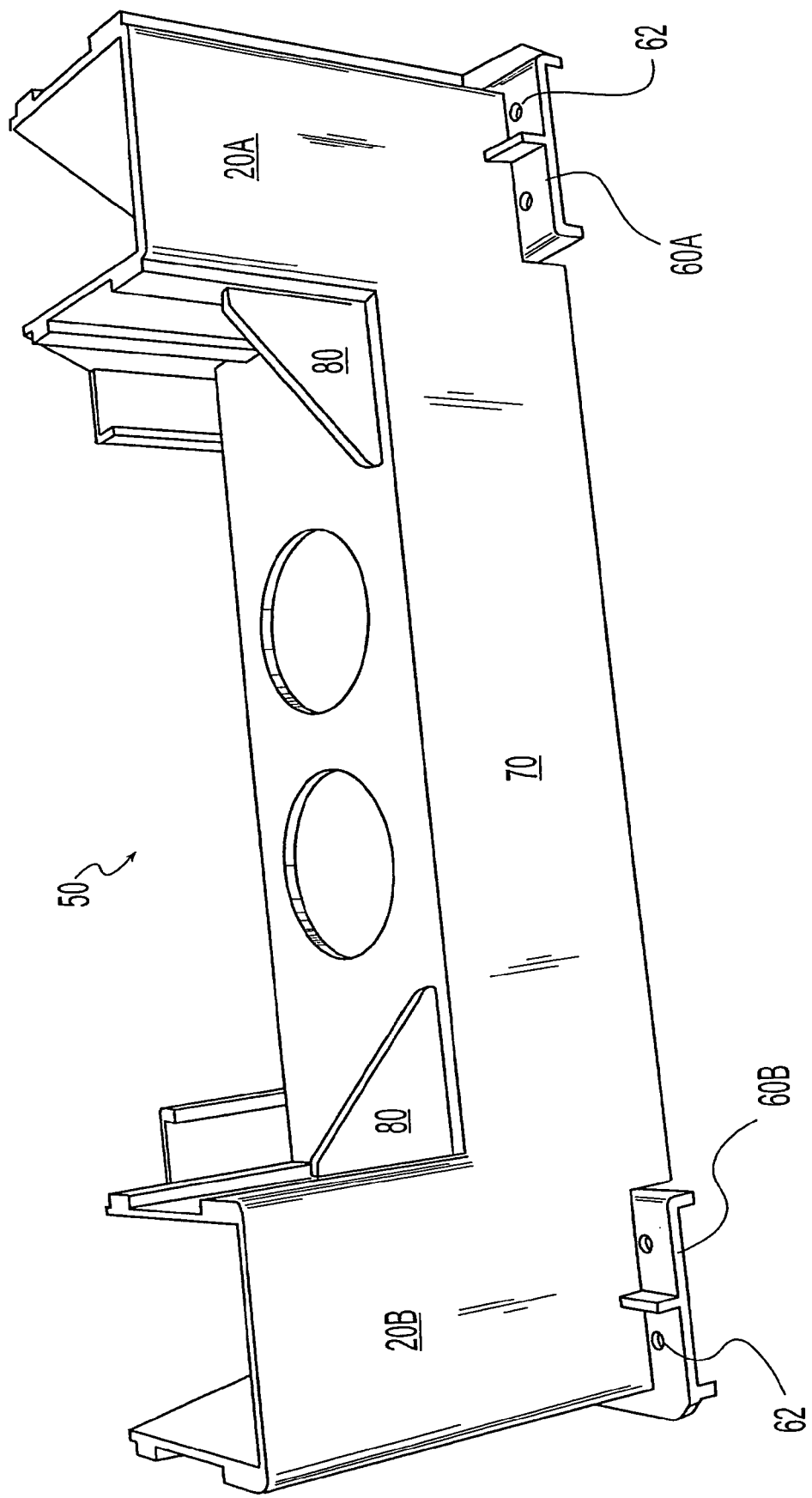
FIG. 6 is a bottom and closed hanger side perspective view of the hanger assembly of FIG. 4.
Figure 7:
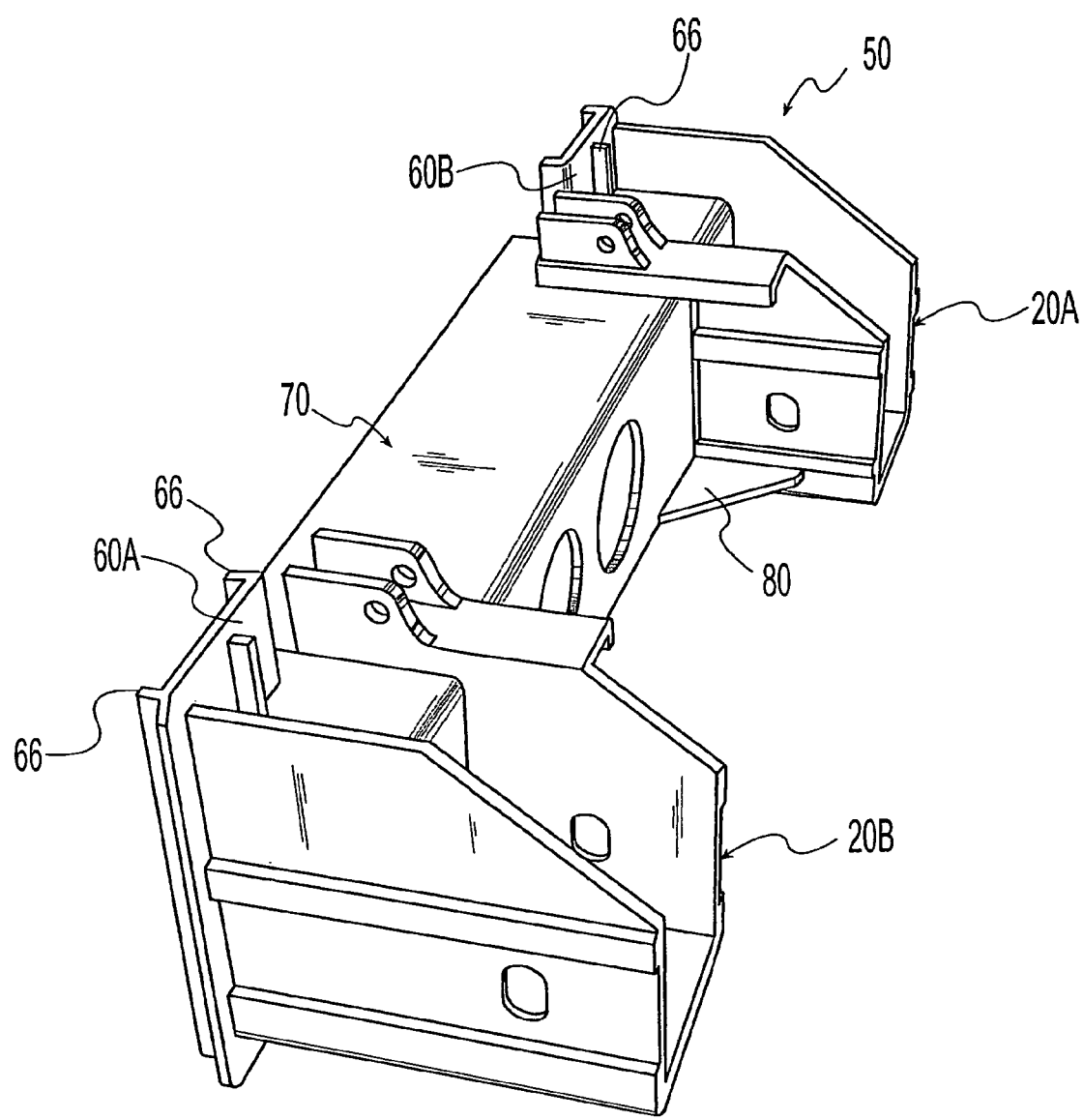
FIG. 7 is an end perspective view of the attachment of the hanger assembly of FIG. 4.

Hanger assembly 50 may also comprise one or more gussets 80 such as the gussets 80 shown positioned adjacent the hangers 20A, 20B and the transverse support member 70. The hanger assembly may also include cross support members 82 as shown in FIG. 5. Cross support members 82 are attached to support member 70 and may extend beyond the trailer attachment plates 60A, 60B as does the support member 70. Cross support members 82 may also be attached to the attachment plates 60A, 60B. The cross support members 82 provide additional strength to the hanger assembly 50.

FIG. 8 shows the hanger assembly 50 attached to the bottom of an aluminum trailer 100 showing an attached swing arm 110, air spring 120, axle assembly 122, a brake housing 128 exposed on one end of the axle 122, and tire/wheel assemblies 126 attached to the other end. The hanger assembly 50 is attached to the longitudinal beam 102 (or to an aluminum plate attached to the trailer for the purposes of attaching a steel suspension) of a trailer 100 with a plurality of fasteners 104 in the form of bolts, and attached to the bottom 106 of the trailer 100 by welds 108.

Referring now to FIG. 9, a hanger assembly 50 is also shown attached to the bottom of an aluminum trailer 100 showing an attached swing arm 110 and shock absorber 124. The swing arm 110 is adjustably attached to hanger 20 by a fastener 112 eccentrically positioned in circular adjustment disk 114 as well known in the art. Disk 114 is captured between spaced-apart portions 38 of the hanger 20. These integral spaced-apart portions 38 not only provide increased strength in the hanger 20 and hanger assembly 50, but also provide adjustability of the swing arm 110 without requiring additional parts to be welded to the hanger 20.

The present invention takes advantage of new developments in aluminum material technology to utilize a lower weight, high strength aluminum product to replace steel structural elements typically used in prior art trailers. Examples of the preferred types of aluminum alloys include 6000 series aluminum and 5454 plate; however, any suitable aluminum alloy can be used, as the present invention is not limited to the recited alloys. The higher strength aluminum enables the weight savings of approximately 400 pounds in one trailer configuration, as compared to a conventional steel subframe and steel suspension. The invention may be used with different trailer types and on trailers constructed of different materials, such as aluminum or composite. The present invention also provides a unique monolithic hanger having an integral shock absorber attachment bracket which is made as an aluminum extrusion. Additionally, the present invention provides a unique method for making an aluminum hanger assembly that can be easily bolted on and welded to existing frameless aluminum trailers and other aluminum trailers that are currently designed for use with steel hangers.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A trailer hanger comprising:
   a one-piece, monolithic hanger body defined from a single aluminum extrusion, said hanger body comprising: (i) a swing arm attachment portion defined by an outboard wall, an inboard wall spaced from the outboard wall, a back wall arranged transverse to and interconnecting the outboard and inboard walls; and (ii) a shock absorber attachment bracket portion defined by a first wall, a second wall spaced from the first wall, and a third wall arranged transverse to and interconnecting the first and second walls.

2. The trailer hanger of claim 1, wherein the outboard wall and the inboard wall of the hanger body include respective alignment guides formed therein and arranged generally parallel to and spaced from each other to provide adjustable axle alignment.

3. The trailer hanger of claim 1, further comprising a trailer attachment plate welded to the hanger, said trailer attachment plate defining a plurality of apertures for attachment of the trailer attachment plate to an associated trailer frame member.

4. The trailer hanger of claim 3, wherein the trailer attachment plate comprises an aluminum extrusion.

5. The trailer hanger of claim 4, wherein the trailer attachment plate comprises an attachment side for abutting with the associated trailer frame member and an opposite non-attachment side, said non-attachment side comprising a strengthening flange extending outwardly therefrom.

6. A trailer hanger comprising:
   a monolithic hanger body wherein the hanger body comprises a swing arm attachment portion and a shock absorber attachment portion, wherein:
   said swing arm attachment portion comprises an outboard wall, an inboard wall parallel, to the outboard wall, a back wall arranged transverse to and interconnecting the outboard and inboard walls, said outboard and inboard walls each defining a swing arm attachment aperture for attachment of an associated swing arm between the outboard and inboard walls; and,
   said shock absorber attachment bracket portion comprises a first wall, a second wall parallel to the first wall, and a third wall arranged transverse to and interconnecting the first and second walls, said first and second walls each defining a shock absorber attachment aperture for attachment of an associated shock absorber between the first and second walls.

7. The trailer hanger of claim 6, wherein said first wall of said shock absorber attachment bracket portion is defined by part of said inboard wall of said swing arm attachment portion.

8. The trailer hanger of claim 7, wherein said trailer hanger comprises an aluminum extrusion.

9. The trailer hanger of claim 6, wherein said monolithic hanger body, including said outboard wall, said inboard wall, said back wall, said first wall, said second wall, and said third wall, is defined by an aluminum extrusion.

10. The trailer hanger of claim 9, wherein said first wall of said shock absorber attachment bracket portion is connected to and extends from said inboard wall of said swing arm attachment, portion.

* * * * *